US008616978B2

(12) United States Patent
Gagner et al.

(10) Patent No.: US 8,616,978 B2
(45) Date of Patent: Dec. 31, 2013

(54) MANAGING WAGERING GAME APPLICATIONS AND EVENTS

(75) Inventors: Mark B. Gagner, West Chicago, IL (US); Jacek A. Grabiec, Chicago, IL (US); Damon E. Gura, Chicago, IL (US); Budyanto Himawan, Schaumburg, IL (US); Jason A. Smith, Vernon Hills, IL (US)

(73) Assignee: WMS Gaming, Inc, Waukegan, IL (US)

(*) Notice: Subject to any disclaimer, the term of this patent is extended or adjusted under 35 U.S.C. 154(b) by 461 days.

(21) Appl. No.: 12/874,196

(22) Filed: Sep. 1, 2010

(65) Prior Publication Data

US 2011/0053672 A1 Mar. 3, 2011

Related U.S. Application Data

(60) Provisional application No. 61/238,876, filed on Sep. 1, 2009.

(51) Int. Cl.

| | |
|---|---|
| ***A63F 9/24*** | (2006.01) |
| ***A63F 13/00*** | (2006.01) |

(52) U.S. Cl.

USPC .................. 463/42; 463/16; 463/17; 463/18; 463/19; 463/20; 463/21; 463/22; 463/23; 463/25; 463/26; 463/27; 463/28; 463/29; 463/30; 463/31; 463/32; 463/33; 463/39; 463/40; 463/41; 463/43; 705/56; 705/57; 705/64; 705/67; 705/72; 705/74; 705/75; 705/78; 705/79; 709/203; 709/204; 709/205; 709/206; 709/207

(58) Field of Classification Search

USPC ........... 463/16–23, 25–33, 39–43; 273/138.1, 273/139, 138.2, 141 A, 454–456, 460; 705/56–57, 64, 67, 72, 74–75, 78–79; 709/203–207, FOR. 113; 713/1, 100, 713/150, 155, 170, 176, 182–184, 186–189, 713/300, 375, 400, 500, 600; 902/2–5, 23, 902/38, 40

IPC ............. A63F 13/00,13/12, 9/24; G06F 17/00, G06F 19/00

See application file for complete search history.

(56) References Cited

U.S. PATENT DOCUMENTS

| | | | | |
|---|---|---|---|---|
| 6,929,264 | B2 * | 8/2005 | Huard et al. .................. | 273/274 |
| 7,548,242 | B1 * | 6/2009 | Hughes et al. ................ | 345/473 |

(Continued)

FOREIGN PATENT DOCUMENTS

| | | |
|---|---|---|
| EP | 1799318 | 3/2006 |
| WO | WO0178855 | 10/2001 |

(Continued)

OTHER PUBLICATIONS

"AU Application No. 2012202162 Examination Report", May 15, 2013 , 4 pages.

(Continued)

*Primary Examiner* — Arthur O. Hall
*Assistant Examiner* — Jasson Yoo
(74) *Attorney, Agent, or Firm* — DeLizio Gilliam, PLLC

(57) ABSTRACT

A wagering game system and its operations are described herein. In embodiments, the operations can include managing multiple instances of gaming applications associated with a wagering game client device and determining event data from the multiple instances of gaming applications. The operations can further include aggregating the event data into an event repository and determining that a requesting application requests some portion of the event data. The operations can further include opening a communication channel between the event data repository and the requesting application, formatting the requested portion of the event data in a format understandable to the requesting application, and communicating the requested portion of the event data to the requesting application via the communication channel. The operations can further include receiving response event data from the requesting application and presenting the response event data on a presentation device associated with the wagering game client device.

25 Claims, 9 Drawing Sheets

(56) References Cited

U.S. PATENT DOCUMENTS

| | | | | |
|---|---|---|---|---|
| 7,618,317 | B2 * | 11/2009 | Jackson | 463/42 |
| 7,719,424 | B2 * | 5/2010 | Steil | 340/572.4 |
| 7,756,905 | B2 * | 7/2010 | Shenfield et al. | 707/803 |
| 7,828,656 | B2 | 11/2010 | Paulsen et al. | |
| 2001/0041612 | A1 * | 11/2001 | Garahi et al. | 463/29 |
| 2003/0064808 | A1 * | 4/2003 | Hecht et al. | 463/42 |
| 2004/0053694 | A1 * | 3/2004 | Rowe | 463/42 |
| 2004/0127284 | A1 | 7/2004 | Walker | |
| 2004/0132532 | A1 | 7/2004 | Brosnan et al. | |
| 2004/0185936 | A1 | 9/2004 | Block et al. | |
| 2005/0032577 | A1 | 2/2005 | Blackburn et al. | |
| 2005/0113172 | A1 | 5/2005 | Gong | |
| 2006/0046817 | A1 | 3/2006 | Paulsen | |
| 2007/0024002 | A1 | 2/2007 | McMain et al. | |
| 2007/0054740 | A1 * | 3/2007 | Salls et al. | 463/42 |
| 2007/0060363 | A1 | 3/2007 | Nguyen et al. | |
| 2007/0243934 | A1 | 10/2007 | Little | |
| 2007/0270212 | A1 | 11/2007 | Cockerille et al. | |
| 2008/0076577 | A1 | 3/2008 | Brosnan et al. | |
| 2008/0125219 | A1 | 5/2008 | Williams et al. | |
| 2009/0069094 | A1 | 3/2009 | Brosnan et al. | |
| 2009/0268754 | A1 * | 10/2009 | Palm et al. | 370/466 |
| 2010/0093441 | A1 | 4/2010 | Rajaraman et al. | |
| 2010/0255900 | A1 | 10/2010 | Ansari et al. | |
| 2011/0070951 | A1 | 3/2011 | Paulsen et al. | |
| 2012/0264504 | A1 | 10/2012 | Gagner et al. | |

FOREIGN PATENT DOCUMENTS

| | | |
|---|---|---|
| WO | WO03023647 | 3/2003 |
| WO | WO2004004280 | 1/2004 |
| WO | WO2004024260 | 3/2004 |
| WO | WO2005083562 | 9/2005 |
| WO | WO-2006026543 | 3/2006 |
| WO | WO-2006033986 | 3/2006 |
| WO | WO2007030301 | 3/2007 |
| WO | WO-2007145954 | 12/2007 |
| WO | WO-2009018488 | 2/2009 |
| WO | WO2009133432 | 11/2009 |

OTHER PUBLICATIONS

"U.S. Appl. No. 13/449,246 Office Action", Jul. 3, 2013 , 16 Pages.

* cited by examiner

MANAGING WAGERING GAME APPLICATIONS AND EVENTS

RELATED APPLICATIONS

This application claims the priority benefit of U.S. Provisional Application Ser. No. 61/238,876 filed Sep. 1, 2009.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

TECHNICAL FIELD

Embodiments of the inventive subject matter relate generally to wagering game systems and networks that, more particularly, manage wagering game applications and application events.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
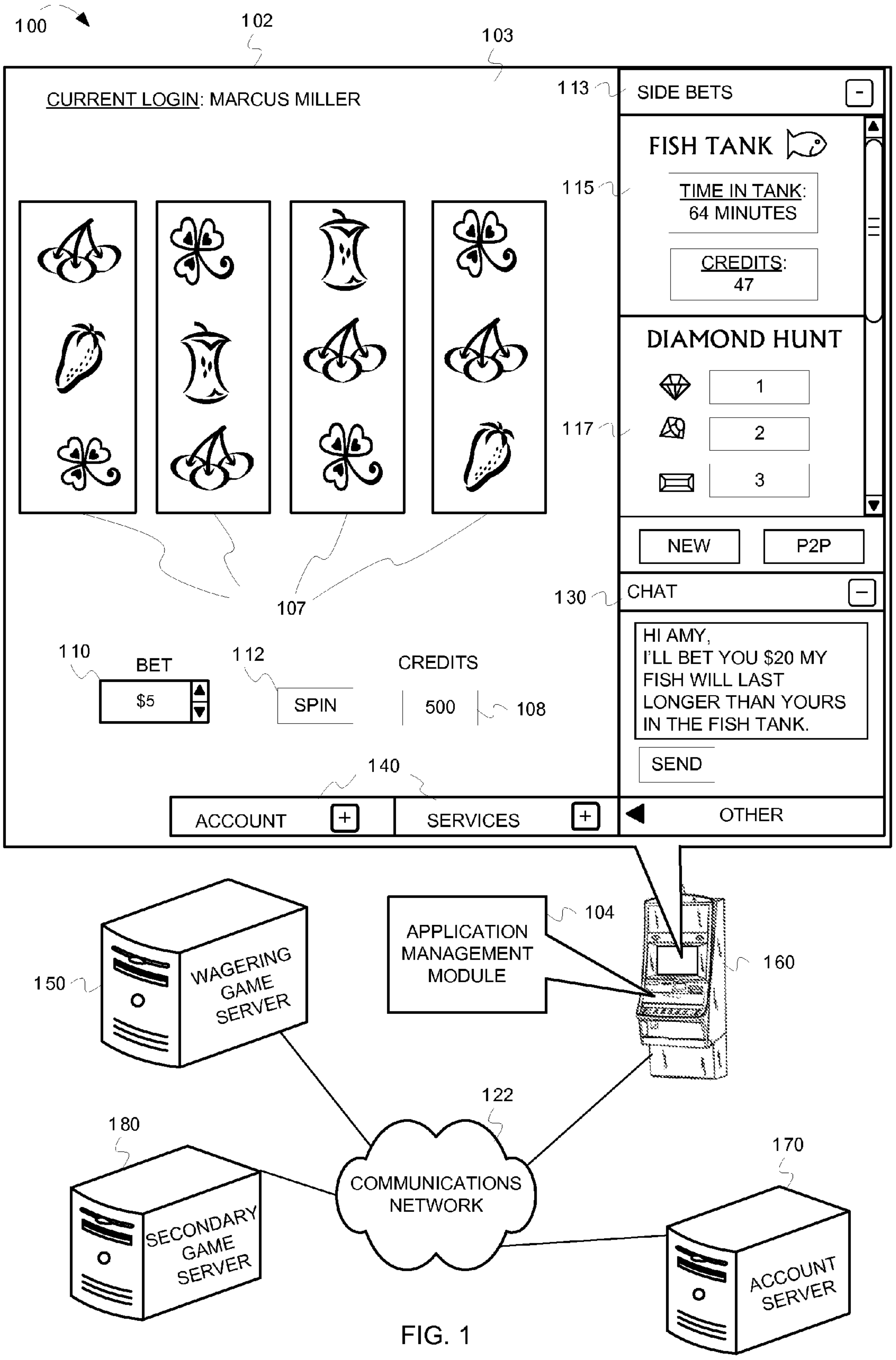
FIG. 1 is an illustration of controlling and managing multiple wagering game applications and events in a wagering game machine, according to some embodiments.

This description of the embodiments is divided into five sections. The first section provides an introduction to embodiments. The second section describes example operating environments while the third section describes example operations performed by some embodiments. The fourth section describes additional example operating environments while the fifth section presents some general comments.

Introduction

This section provides an introduction to some embodiments.

Wagering games are expanding in popularity. Wagering game enthusiasts expect continuous innovations to the wagering game experience. Wagering game developers have begun to develop ways of presenting content from multiple data sources on a wagering game machine simultaneously. However, developers have encountered challenges in coordinating and controlling the communication of events that occur from the multiple applications. The multiple events from the multiple applications can potentially affect each other's objects, services, functionality, etc. For example, a first application, such as a primary wagering game, may run on a wagering game machine. The primary wagering game may control an object, such as a credit meter, and may generate a first set of events that affect a credit amount value on the credit meter. Other applications, for instance, a secondary gaming application that runs on the wagering game machine, may not have control of the credit meter. However, the secondary gaming application may individually generate an additional set of events that can affect the credit amount value on the credit meter. Thus, developers are faced with challenges in coordinating the events from the primary wagering game application and the secondary gaming application so that the credit meter shows a correct value. In addition to potentially affecting a credit meter object, events from applications (e.g., client applications, server applications, etc.) can affect other objects, services, functionality, etc. associated with the wagering game machine (e.g., window positions, side-bet meters, betting options, game play elements, player-to-player communication options, etc.).

Further, some wagering game developers are developing wagering game machines that can concurrently run multiple independent wagering game applications. The independent wagering game applications, which may be developed by different wagering game manufacturers, may generate differing data formats. Thus, developers face further challenges in coordinating and controlling communications when the multiple applications may communicate events in different communication and/or data formats.

Embodiments of the inventive subject matter, however, can coordinate and control communications between multiple applications that run on, or that affect a wagering game machine, or any other wagering game client device or device used in a casino network. For example, in some embodiments, an application management module can receive events from the multiple applications and direct the events to applications that request data for the events ("event data"). In some embodiments, the application management module can analyze information associated with the event data to determine event types (e.g., analyze descriptive tags embedded in event data, analyze event metadata, analyze data associated with player accounts that initiate the events, etc.). The application management module can then provide the event data to data sources that may be interested in event types. Further, in some embodiments, the application management module, or agents of the application management module, can convert, or reformat, event data into formats that are decodable by (e.g., can be understood and used by), applications that receive the event data. In some embodiments, the application management module can also coordinate the presentation of content (e.g., the location of windows, the presentation priority, etc.), on presentation devices associated with the wagering game machine, for multiple applications running on a wagering game machine.

Some embodiments describe examples of managing wagering game applications and events in a network. Embodiments can be presented over any type of communications network (e.g., public or private) that provides access to wagering games, such as a website (e.g., via wide-area-networks, or WANs), a private gaming network (e.g., local-area-networks, or LANs), a file sharing networks, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling".

FIG. 1 is a conceptual diagram that illustrates an example of controlling and managing multiple wagering game applications and events in a wagering game machine, according to some embodiments. In FIG. 1, a wagering game system ("system") 100 includes a wagering game machine 160 connected to a primary data source (e.g., a wagering game server 150) via a communications network 122. The wagering game server 150 can provide primary gaming content and control instructions for server-based games. Also connected to the communications network 122 are a secondary content source (e.g., a secondary game server 180). The secondary game server 180 can provide secondary gaming content and control instructions secondary wagering games on the wagering game machine 160. The wagering game server 150 can provide content and control data for primary wagering games on the wagering game machine 160. In some embodiments, the secondary game server 180 can provide secondary wagering games independent of the primary wagering game. The secondary game server 180 can also provide other non-game play content and services. In some embodiments, the wagering game server 150 and the secondary game server 180 are combined into a single server.

The system 100 can include an application management module 104 that can manage client elements of, communicate events from, convert data for, manage resource contention for resources (e.g., video, sound, etc.) on, and otherwise control interoperability between, and for, applications on the wagering game machine 160. The application management module 104, in some embodiments, can be on, or associated with a device controlled by, the wagering game machine 160. In other embodiments, however, the application management module 104 can be on a device that is associated with (e.g., external to, peripheral to, interfaced with, etc.) the wagering game machine 160. The application management module 104 can manage primary and secondary applications contemporaneously (e.g., concurrently, simultaneously, etc.) on the wagering game machine 160. For example, in some embodiments, the wagering game machine 160 can run multiple independent applications at the same time ("concurrently running applications"). The concurrently running applications can be related to game play as well as to non-game play content that is utilized on a wagering game network. Examples of game play applications may include specifically configured wagering games, locally running primary wagering games (e.g., base games), bonus games, progressive games, community games, secondary wagering games, toolbar and widget games, independent gaming applications, side betting applications, etc. Examples of non-game play applications may include casino player loyalty applications, casino services applications (e.g., drink ordering, ticket sales, etc.), player account management applications (e.g., player login, session management, financial transactions, etc.), advertising, social applications (e.g., player-to-player chat), maintenance applications, Internet applications, non-display related applications (i.e., applications that run but that do not display content), etc.

The application management module 104 can coordinate and control communications between the concurrently running applications. For example, in some embodiments, the application management module 104 can receive events from side-bet applications 113 and from a primary wagering game application 103 (i.e., a slot game having slot reels 107, a bet meter 110, a spin control 112, and a credit meter 108). In some embodiments, the application management module 104 can route and/or publish event data between the side-bet applications 113 and the primary wagering game application 103. In some embodiments, the side-bet applications 113 and the primary wagering game application 103 can pre-register with the application management module 104 to receive events from specific applications or to receive events that fit into pre-determined categories (e.g., data types, activity types, player types, etc.). The application management module 104 can aggregate (e.g., collect and store), data for types of events that the side-bet applications 113 and the primary wagering game application 103 require to know about. In some embodiments, the application management module 104 can analyze information associated with event data (e.g., analyze descriptive tags embedded in event data, analyze event metadata, analyze data associated with player accounts that initiate the events, etc.). The application management module 104 can then provide the aggregated event data to applications that request, require, or otherwise may be interested in the event data. The application management module 104 can also provide the event data to the wagering game server 150, the secondary game server 180, an account server 170, or any other data source or application, external to the wagering game machine 160, that may be interested in the event data. Further, in some embodiments, the application management module 104, or agents of the application management module 104, can convert, or re-format, event data into formats that are understood by, and can be used by, applications and data sources that are interested in the event data. In some embodiments, the application management module 104 can also coordinate the presentation of content (e.g., the location of windows, the presentation priority, etc.) on presentation devices (e.g., displays, speakers, etc.) associated with the wagering game machine 160. For example, the system 100 can generate a composite window 102 that incorporates the side-bet applications 113 with the primary wagering game application 103, a chat application 130, and other applications 140

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Wagering Game System Architecture

Figure 2:
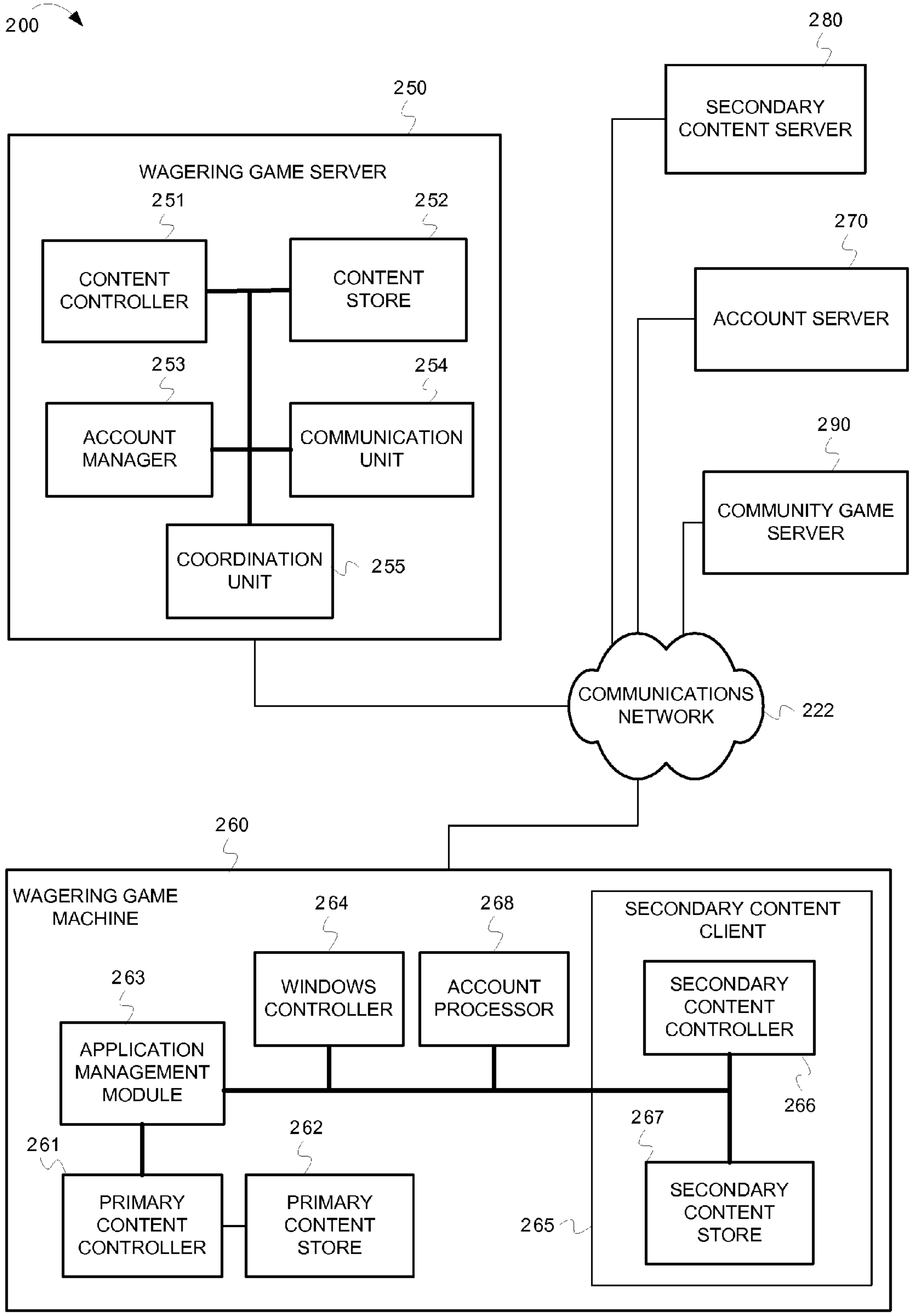
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include an account server 270 configured to control user related accounts accessible via wagering game networks and social networks. The account server 270 can store wagering game player account information, such as account settings (e.g., settings related to group games, settings related to social contacts, etc.), preferences (e.g., player preferences regarding primary games, player preferences regarding secondary content, player preferences regarding award types, player preferences related to virtual assets, etc.), player profile data (e.g., name, avatar, screen name, etc.), and other information for a player's account (e.g., financial information, account identification numbers, virtual assets, social contact information, etc.). The account server 270 can contain lists of social contacts referenced by a player account. The account server 270 can also provide auditing capabilities, according to regulatory rules. The account server 270 can also track performance of players, machines, and servers.

The wagering game system architecture 200 can also include a wagering game server 250 configured to control wagering game content, provide random numbers, and communicate wagering game information, account information, content coordination information, and other information to and from a wagering game machine 260. The wagering game server 250 can include a content controller 251 configured to manage and control content for the presentation of content on the wagering game machine 260. For example, the content controller 251 can generate game results (e.g., win/loss values), including win amounts, for games played on the wagering game machine 260. The content controller 251 can communicate the game results to the wagering game machine 260. The content controller 251 can also generate random numbers and provide them to the wagering game machine 260 so that the wagering game machine 260 can generate game results. The wagering game server 250 can also include a content store 252 configured to contain content to present on the wagering game machine 260. The wagering game server 250 can also include an account manager 253 configured to control information related to player accounts. For example, the account manager 253 can communicate wager amounts, game results amounts (e.g., win amounts), bonus game amounts, etc., to the account server 270. The wagering game server 250 can also include a communication unit 254 configured to communicate information to the wagering game machine 260 and to communicate with other systems, devices and networks. The wagering game server 250 can also include a coordination unit 255 configured to coordinate communications and control information between multiple data sources, including wagering game machines, account servers, third party servers, and any other device associated with, or connected to, a wagering game network.

The wagering game system architecture 200 can also include a secondary content server 280 configured to provide content and control information for secondary games and other secondary content available on a wagering game network (e.g., secondary wagering game content, promotions content, advertising content, player tracking content, web content, etc.). The secondary content server 280 can provide "secondary" content, or content for "secondary" games presented on the wagering game machine 260. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa.

The wagering game system architecture 200 can also include a community game server 290 configured to provide and control content for community games, including networked games, social games, competitive games, or any other game that multiple players can participate in at the same time.

The wagering game system architecture 200 can also include the wagering game machine 260 configured to present wagering games and receive and transmit information to manage multiple wagering game applications. The wagering game machine 260 can include a primary content controller 261 configured to manage and control the presentation of primary content on the wagering game machine 260. The wagering game machine 260 can also include a primary content store 262 configured to contain primary content to present on the wagering game machine 260. The wagering game machine 260 can also include an application management module 263 configured to manage (e.g., aggregate, publish, route, convert, etc.) communication and interpretation of events between applications, services, components, etc. of the wagering game machine 260 and other devices associated with and/or external to the wagering game machine 260. The wagering game machine 260 can also include a windows controller 264 configured to work in conjunction with the application management module 263 to perform instructions received by, and or generate instructions on behalf of, the application management module 263, that manipulate and control windows, or other user interfaces, presented on the wagering game machine 260. The wagering game machine 260 can also include an account processor 268 configured to control and communicate account information (e.g., financial transactions, player tracking information, etc.). The wagering game machine 260 can also include at least one secondary content client 265 configured to present secondary content applications (e.g., client player instances). The secondary content client 265 can receive event data from, and provide event data to, the application management module 263. The secondary content client 265 can include a secondary content controller 266 and a secondary content store 267. The secondary content controller 266 can be configured to manage and control the presentation of secondary content on the wagering game machine 260, which secondary content is specific to the secondary content client 265. The secondary content store 267 can be configured to store secondary content on the wagering game machine 260.

Each component shown in the wagering game system architecture 200 is shown as a separate and distinct element connected via a communications network 222. However, some functions performed by one component could be performed by other components. For example, the wagering game server 250 can also be configured to perform functions of the primary content controller 261, the primary content store 262, the application management module 263, the windows controller 264, the account processor 268 and other network elements and/or system devices. Furthermore, the components shown may all be contained in one device, but some, or all, may be included in, or performed by multiple devices, as in the configurations shown in FIG. 2 or other configurations not shown. For example, the account manager 253 and the communication unit 254 can be included in the wagering game machine 260 instead of, or in addition to, being a part of the wagering game server 250. Further, in some embodiments, the wagering game machine 260 can determine wagering game outcomes, generate random numbers, etc. instead of, or in addition to, the wagering game server 250.

The wagering game machines described herein (e.g., wagering game machine 260) can take any suitable form, such as floor standing models, handheld mobile units, bar-top models, workstation-type console models, surface computing machines, community gaming tables, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable storage media including instructions for performing the operations described herein. Machine-readable storage media includes any mechanism that provides stores information in a form readable by a machine (e.g., a wagering game machine, computer, etc.). For example, tangible machine-readable storage media includes read only memory (ROM), random access memory (RAM), magnetic disk storage media, optical storage media, flash memory machines, etc. In some embodiments, machine-readable signal media may include any media suitable for transmitting software over a network.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
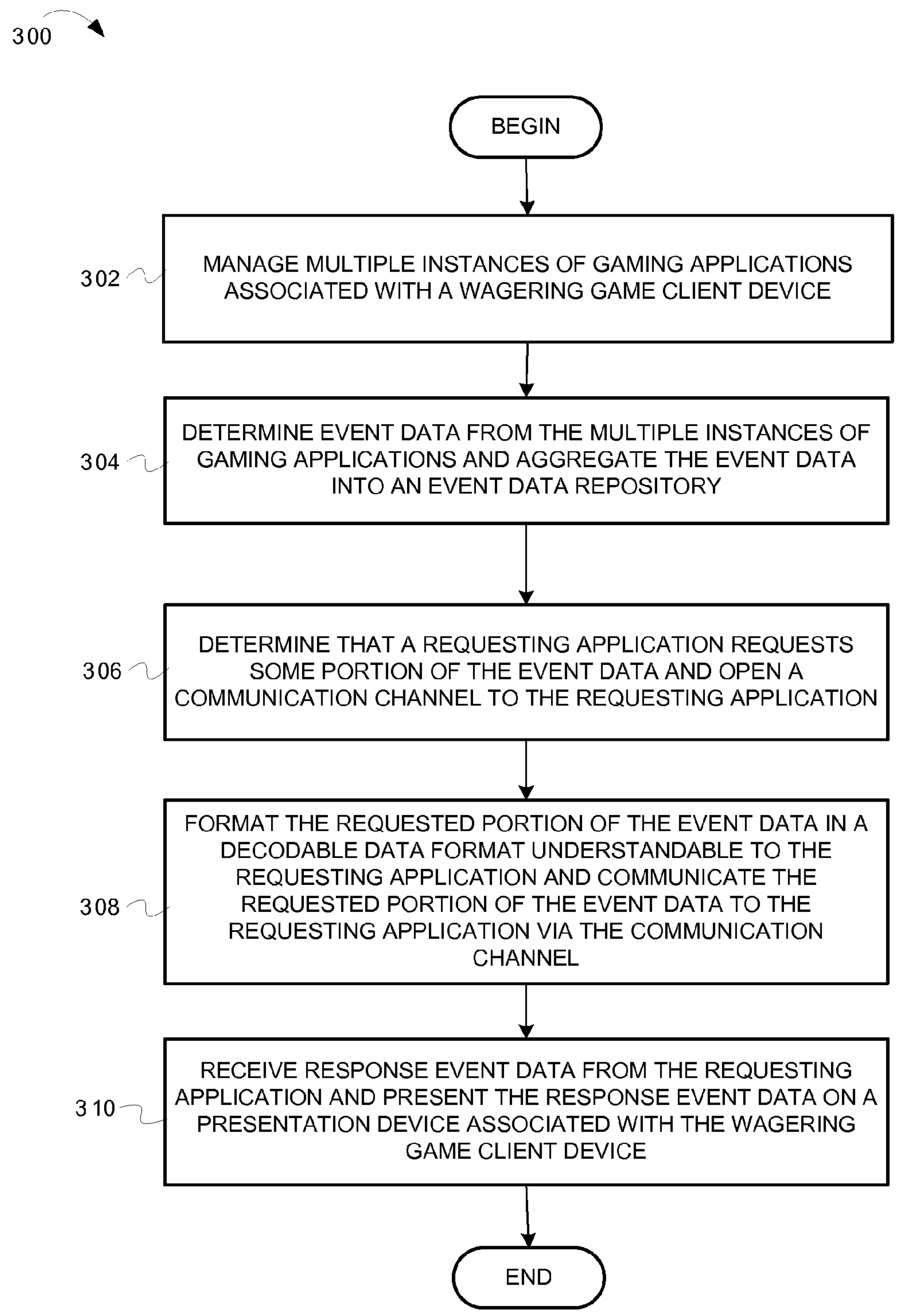
FIG. 3 is a flow diagram 300 illustrating managing multiple wagering game applications and application event data on a wagering game client device, according to some embodiments.

FIG. 3 is a flow diagram ("flow") 300 illustrating managing multiple wagering game applications and application event data on a wagering game client device, according to some embodiments. FIGS. 4, 5, 6, and 7 are conceptual diagrams that help illustrate the flow of FIG. 3, according to some embodiments. This description will present FIG. 3 in concert with FIGS. 4, 5, 6 and 7. In FIG. 3, the flow 300 begins at processing block 302, where a wagering game system ("system") manages multiple instances of gaming applications associated with a wagering game client device. For example, an application management module associated with the system can launch, load, unload and control applications and instances of applications. The application management module can launch different software players (e.g., a Microsoft® Silverlight™ player, an Adobe® Flash® player, etc.) and manage, coordinate, and prioritize what the software players do. The application management module can also coordinates instances of the server applications in addition to local copies of applications. The application management module can control window locations on a wagering game screen or display for the multiple gaming applications. In some embodiments, the application management module can manage window locations on multiple displays including displays on devices associated with and/or external to the wagering game client device (e.g., a top display and a bottom display on the wagering game client device, a peripheral device connected to the wagering game client device, a mobile device connected to the wagering game client device, etc.). The application management module can manage priority or precedence of clients that compete for the same display area. For instance, the application management module can determine each client application's precedence. The precedence may be static (i.e. set only when the client first launches or connects) or dynamic. The applications may provide precedence values to the application management module, which the application management module can use to establish order and priority. The precedence, or priority, values can be related to tilt events, administrative events, primary game events (e.g., hierarchical, levels, etc.), secondary game events, local bonus game events, advertising events, etc. As each client runs, it can also inform the application management module of its current presentation state. The applications may provide presentation state values to the application management module, which the application management module can use to evaluate and assess priority. Examples of presentation states may include celebration states (e.g., indicates that client is currently running a win celebration), playing states (e.g., indicates that the client is currently playing), game starting states (e.g., indicates that the client is showing an invitation or indication that a game is about to start), status update states (e.g., indicates that the client is not 'playing' but has a change of status that should be annunciated, such as a change in progressive meter values or a change in a bonus game multiplier), idle states (e.g., indicates that the client is idle), etc. In some embodiments, the application management module can be pre-configurable. The system can provide controls and interfaces for operators to control screen layouts and other presentation features for the configuring the application management module. The application management module can communicate with, and/or be a communication mechanism for, a base game stored on a wagering game machine. For example, the application management module can communicate events from the base game such as the base game state, pay line status, bet amount status, etc. The application management module can also provide events that assist and/or restrict the base game, such as providing bet amounts from secondary gaming applications, inhibiting play based on gaming event priority, etc. The application management module can also communicate some (or all) financial information between the base game and other applications including amounts wagered, amounts won, base game outcomes, etc. The application management module can also communicate pay table information such as possible outcomes, bonus frequency, etc.

In some embodiments, the application management module can control different types of applications. For example, the application management module can perform rendering operations for presenting applications of varying platforms, formats, environments, programming languages, etc. For example, the application management module can be written in one programming language format (e.g., Javascript, Java, C++, etc.) but can manage, and communicate data from, applications that are written in other programming languages or that communicate in different data formats (e.g., Adobe® Flash®, Microsoft® Silverlight™, Adobe® Air™, hypertext markup language, etc.). The application management module can include a portable virtual machine capable of generating and executing code for the varying platforms, formats, environments, programming languages, etc. The application management module can enable many-to-many messaging distribution and can enable the multiple applications to communicate with each other in a cross-manufacturer environment at the client level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

In some embodiments, the wagering game client device can be a wagering game machine, a community wagering game table, a kiosk, a media controller, or any other device within a casino, or associated with a casino network, that can run multiple gaming applications. The application management module can run on the wagering game client device. The application management module can also manage applications that run on external devices (e.g., a peripheral, a mobile device, a top-box, a docking port, etc.) connected (e.g., wirelessly or otherwise) with the wagering game client device. Instances of the application management module can be on both the wagering game client device and external devices (e.g., could be logged on to both devices at the same time). In some embodiments, the application management module can push instances of client software to different devices and manage the communication of events between the different devices and the wagering game client device. The application management module can communicate with various servers and network data sources including wagering game servers, community game servers, progressive servers, third-party application servers, account servers, etc. The application management module can also run within the framework of an operating system.

The flow 300 continues at processing block 304, where the system determines event data from the multiple instances of gaming applications and aggregates the event data into an event repository. In embodiments, multiple applications may include a primary wagering game on a wagering game machine and at least one additional secondary application, a community wagering game at a community game table and at least one additional secondary application, two separate secondary applications, or combinations thereof. In some embodiments, the event data originates from events that are occurring in the system. The events can relate to activities (e.g., gaming events, social communications, side bets, accounting, etc.) that occur in applications on a wagering game machine and/or on associated server(s). The events can also relate to secondary services, such as web services, maintenance, etc. Events can also relate to network type events, such as environmental events (e.g., networked lights and sounds), player tracking, progressive jackpots, long-running community games, etc.

In some embodiments, the application management module manages the event repository. The event data repository can be an event log stored on the wagering game client device, or stored on any other network device (e.g., a wagering game server, a network controller, etc.) that is accessible to the application management module.

The flow 300 continues at processing block 306, where the system determines that a requesting application requests some portion of the event data and opens a communication channel to the requesting application. The application management module can determine requests by referring to a subscription list that indicates a list of specific applications and data sources that subscribe to events that occur by applications associated with the wagering game client device. The subscription lists may be specified, or categorized, so that some applications and/or data sources request data for only certain event types. Event types can be based on any of a number of criteria including, but not limited to, application types, subject matter types, event amounts, times of day, player types, player settings, etc. In some embodiments, the application management module can analyze information associated with the event data (e.g., analyze descriptive tags embedded in event data, analyze event metadata, analyze data associated with player accounts that initiate the events, etc.) to determine event types. The application management module can then provide the event data to applications and/or data sources that may be interested in the determined event types. In some embodiments, the requesting application may reside on data sources external to the wagering game client device, such as servers, personal mobile devices, etc. In some embodiments the requesting application can be applications and/or client environments within the wagering game client device (e.g., one or more applications that may require use of the event data) and/or on devices associated with (e.g., under the control of) of the wagering game client device (e.g., docked devices, mobile devices wirelessly connected, peripherals, etc.). In some embodiments, the application management module can use one or more application protocol interfaces (APIs) to communicate between applications on the wagering game client device and/or on external devices.

The application management module can open the communication channel (e.g., open a TCP socket, utilize a pipe, etc.) within the environment of the wagering game client device with the requesting application. The application management module can listen and talk over the communication channel. The application management module can perform communication handshaking and generate initialization messages when establishing the communication channel. The application management module can also send heart beats to the requesting application to indicate that the connection is still up and/or to enable recovery strategies. The application management module can communicate over the communications channel in any format understandable to the requesting application. The application management module can open as many communications channels as it needs to communicate with multiple applications concurrently. The application management module can open communication channels between the application management module and multiple servers (e.g., to a wagering game server, to third-party servers, etc.). The application management module can also open multiple communication channels for a single application. In some embodiments, the application management module can talk to counter-part applications that can talk to the requesting application (e.g., a previous version of the requesting application, an intermediary application that talks between the requesting application and the application management module). The communication channel can be secured using a secure protocol (e.g., Secure Real Time Messaging Protocol (RTMPS) protocol for Adobe®, Secure Hypertext Transfer Protocol (HTTPS), etc.)

In one example, the application management module can communicate event data between applications that have events that affect a credit meter owned by a primary wagering game application. The application management module can communicate betting events from the applications, individually, to a wagering game server and to an account server. The wagering game server and the account server can transact the bets and produce an updated credit meter value. The application management module can receive the updated credit meter value and communicate it to the applications so that the primary wagering game can present the updated credit meter value. In other examples, one of the applications can conduct side bets every time a primary wagering game spins game reels, or activates any other type of wagering game transaction. For example, when a player activates a spin button repeatedly, the secondary application can buy side bets repeatedly, coordinated to the repeated spins. In other examples, the application management module can communicate purchase data (e.g., buying show tickets, shopping online, etc.) between a secondary application and an account server. The application management module can provide the secondary application and the account server with the proper information, in the proper format, and communicate updated account credit amounts to the primary wagering game so that the primary wagering game can update the credit meter. The application management module, thus, can coordinate various financial events to ensure that the credit meter is continuously showing the right credit amount. The application management module can also coordinate, or synchronize, all other game related activities (e.g., reel spin animations, sounds, bonus activity, money input, etc.).

Figure 4:
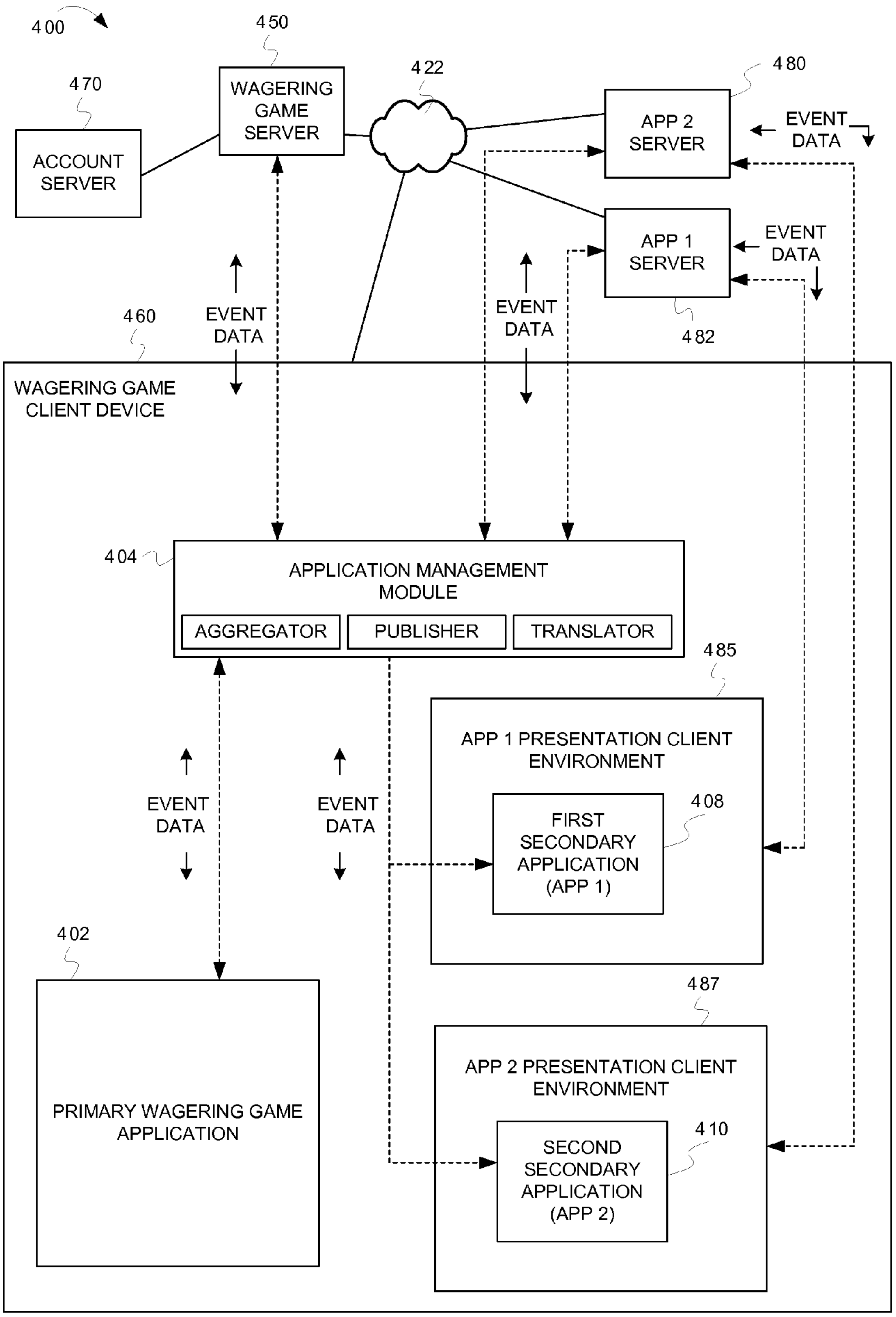
FIG. 4 is an illustration of managing wagering game event data from multiple sources, according to some embodiments.

An example of determining requesting applications and opening communication channels is illustrated in FIG. 4. In FIG. 4, a wagering game system ("system") 400 includes a wagering game client device 460 is connected via a communications network 422 to several different data sources, including a wagering game server 450, a first third-party application server ("first application server") 482 and a second third-party application server ("second application server) 480 The data sources can speak in an agreed upon protocol. For example, the first application server 482 provides event data to an application management module 404 using the protocol. The application management module 404 can aggregates the event data from the first application server 482 then publishes, or makes the event data available, to any other source that is interested in the event data. The application management module 404 can include aggregator and publishing modules that assist in aggregating and publishing data. For example, the application management module 404 can repackage the event data from the first application server 482 in an agreed upon format and publish the repackaged event data to the second application server 480, the wagering game server 450, a first application presentation client environment 485, a second application presentation client environment 487, etc. In another example, the first application presentation environment 485 can receive and/or generate instructions to launch a first secondary application 408. The first application presentation environment 485 can communicate with the application management module 404 to launch, control, and unload the first secondary application 408. Further, the second application presentation environment 487 can receive and/or generate instructions to launch a second secondary application 410. The second application presentation environment 487 can communicate with the application management module 404 to launch and control the second secondary application 410. The first secondary application 408 and the second secondary application 410 can generate event data that the application management module 404 coordinates with event data from a primary wagering game application 402 to control wagering games provided by the wagering game server 450 and update a player's account balance associated with an account server 470. The application management module 404 can open communication channels between the first secondary application 408, the second secondary application 410, and the primary wagering game application 402 to coordinate and communicate the event data. In some embodiments, the application management module 404 can also include a translator module that can reformat data for communications protocols that are different from each other.

Figure 5:
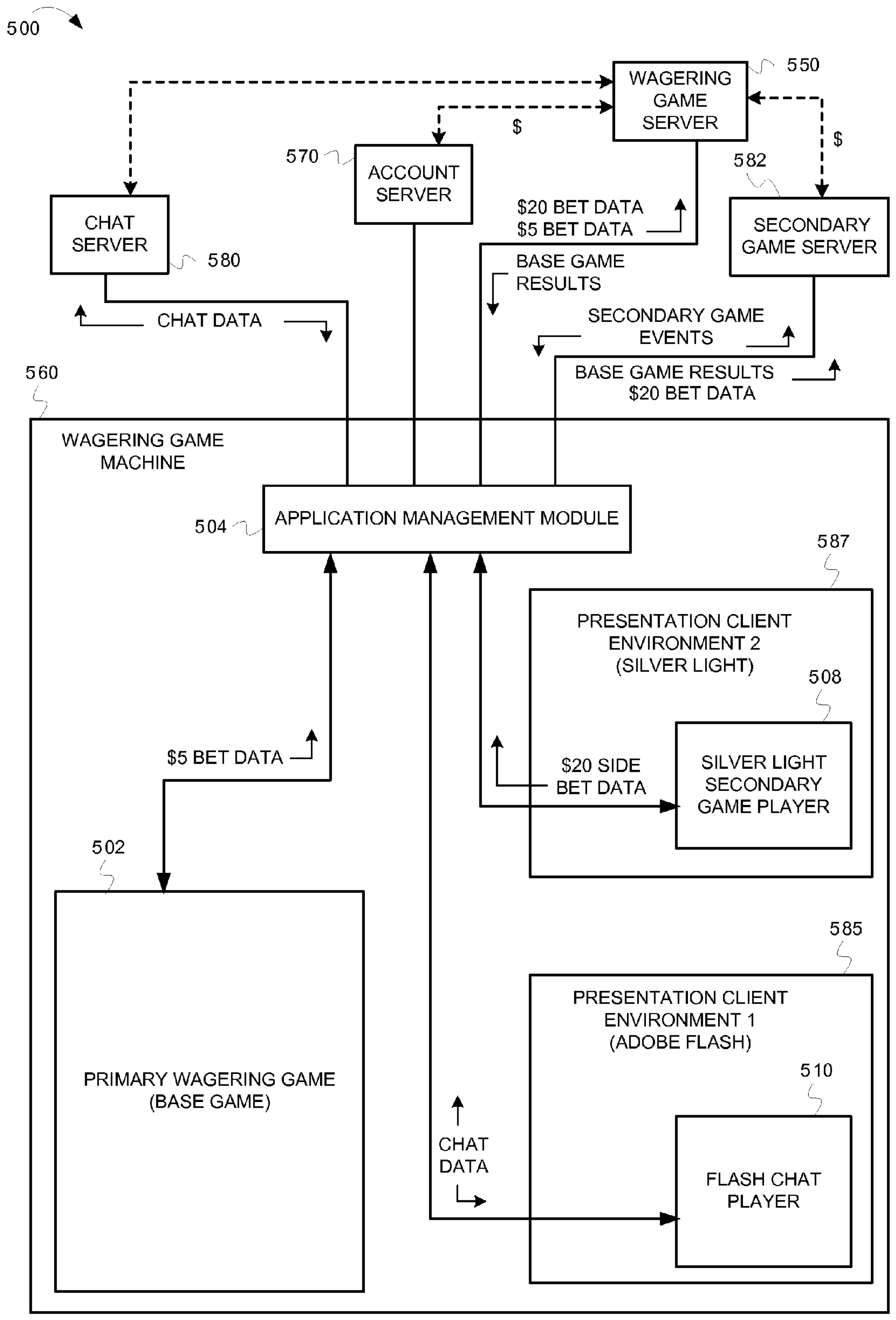
FIG. 5 is an illustration of managing wagering game event data in different data formats, according to some embodiments.

The flow 300 continues at processing block 308, where the system formats the requested portion of the event data in a decodable data format understandable to the requesting application and communicates the requested portion of the event data to the requesting application via the communication channel. The application management module can receive event data in different data formats (e.g., different data transmission protocols) and can reformat (e.g., translate, covert, etc.) data formats to ensure that all applications on the wagering game client device communicate properly. The application management module can publish the events in their reformatted data formats to all data sources that have subscribed to the events. FIG. 5 illustrates an example of a wagering game system ("system") 500 that is configured to recognize a data format requested by a requesting data source and format the event data in the data format utilized by the requesting data source. In some embodiments, the data format for the requesting data source is different from the data format of the original event data as provided by the providing source of the event data. The system 500, however, converts the data format to be understandable to the requesting data source. In FIG. 5, the system 500 includes an application management module 504 associated with a wagering game machine 560. The wagering game machine 560 is connected to, and communicates with, several servers, including a wagering game server 550, a secondary game server 582, a chat server 580 and an account server 570. The wagering game machine 560 can also include a first presentation client environment 585 that provides data in an Adobe® Flash® ("Flash") data format. The wagering game machine 560 also includes a second presentation client environment 587 that provides data in a Microsoft® Silverlight™ ("Silverlight") data format. A Silverlight secondary-game player ("Silverlight player") 508 can receive event data in the Silverlight data format and understand the data without conversion. A Flash chat player ("Flash player") 510 can receive event data in the Flash data format and understand the data without conversion because the Flash player 510 is configured to natively generate and understand the Flash data format. However, a primary wagering game ("base game") 502 may be written in and/or produce data in a different data format than either Flash or Silverlight. Further, the first presentation client environment 585 may not be able to decode the Silverlight data format, and second presentation client environment 587 may not be able to decode the Flash data format. Consequently, if the base game 502, the first presentation client environment 585, the second presentation client environment 587, the Silverlight player 508 or the Flash player 510 create event data in their individual, client-generated, data formats, they would not be able to decode, or understand, each other's client-generated event data. The application management module 504, however, can aggregate event data in the different formats into an event data repository associated with the application management module 504. The application management module 504 can analyze (e.g., from subscription data related to subscribed data sources) specified data formats that data sources can decipher or decode. The application management module 504 can open communication channels to the different data sources (e.g., the base game 502, the first presentation client environment 585, the second presentation client environment 587, the Silverlight player 508 or the Flash player 510) and recognize data formats that those data sources require to understand event data (e.g., recognize from subscription data or query the data sources for required or preferred data formats). The application management module 504 can convert the event data from one data format to another and publish the event data to each individual data source in the format that the data source understands, requires, or prefers. For example, the chat server 580 may provide a chat interface using the Flash player 510. Events that occur in the Flash player 510 may be related to a $20 side bet made within the Silverlight player 508. At the same time, the base game 502 may make a $5 bet on a wagering game presented in the base game 502. However, neither the base game 502, the Silverlight player 508 or the Flash player 510 understand what occurs with each other, in part, because they produce data in different data formats that they do not individually understand (i.e., that are un-decodable to each other). The application management module 504, however, recognizes those data formats, and can manage communications between the base game 502, the Silverlight player 508 and the Flash player 510. Further, the servers (i.e., the chat server 580, the secondary game server 582, the wagering game server 550 and the account server 570) also need to receive event data. The application management module 504 can provide event data to the servers. For instance, the application management module 504 can provide the $20 side-bet event data to the secondary game server 582 in the Silverlight data format, as generated by the Silverlight player 508, or it can determine that the secondary game server 582 prefers a different data format. The application management module 504 can convert the $20 side-bet event data to the preferred format and provide the converted $20 side-bet event data to the secondary game server 582. The secondary game server 582 can respond to the $20 side-bet event data, at some point, with response data, such as secondary game results (i.e., who won the $20 side-bet). In the example of FIG. 5, the base game 502, however, may control a credit meter that indicates a player account's credit values. The $20 side-bet may have been won, or lost, by the player account, so the base game 502 is responsible for presenting an updated credit meter value reflecting the won or lost $20 side-bet. Contemporaneously, the wagering game server 550 may receive the $5 bet data and generate base game results indicating a win or loss for the $5 bet. The application management module 504 can publish the $5 bet event data, in the original data format provided by the base game 502 or converted, as needed, to the wagering game server 550. Concurrently, the application management module 504 can also provide the $20 side-bet results to the wagering game server 550. The wagering game server 550 (or the application management module 504 directly) may communicate both the event results for the $5 bet and the $20 side-bet to the account server 570 so that the account server 570 can transact the $5 and the $20 from the player account stored on the account server 570. The account server 570 can provide an updated account balance to the wagering game server 550 and/or to the application management module 504. The wagering game server 550 can also, or instead, convey the updated account balance depending on the configuration of the system 500. When the application management module 504 receives the updated account balance, the application management module 504 can communicate the updated account balance to the base game 502 to update on the credit meter. In addition, the application management module 504 can provide a message to the Flash player 510 to send a chat message to the player account indicating an updated account balance. The application management module 504 can also instruct the Flash player 510 to provide chat messages, or provide options to create chat messages, to other player accounts that indicate the results of the base game and/or the secondary wagering game. Further, the application management module 504 can provide instructions to the Silverlight player 508 to present updated account balance data and or other data from the chat server 580, the secondary game server 582, the wagering game server 550, or any other data source. The application management module 504 can convert all data formats during any of those communications. Thus, the application management module 504 can manage different applications written in proprietary formats and/or that produce varying data formats, whether proprietary or public, in formats that any individual application can understand. The application management module 504 can determine proper start up procedures, determine how to communicate between applications, determine proper handshakes between applications, determine how to handle communication failures or breaks in the secure channel, etc. Thus, the application management module 504 can determine proper data formats for performing all of the aforementioned activities and translate, or convert, data formats to facilitate communications between sources that perform the activities using different or varying data formats.

The flow 300 continues at processing block 310, where the system receives response event data from the requesting application and presents the response event data on a presentation device associated with the wagering game client device. In some embodiments, the system can present representations of the response event data in a common area of the presentation device. The common area can be configured to include information related to events for the multiple instances of the wagering game applications. In some embodiments, the system can coordinate multiple betting events from different applications, as described above in FIG. 5, and present updated account information for both transacted wagers on a common credit meter. In FIG. 1, for instance, a credit meter 108 can show account information for side bets in a first side-bet application 115 and/or a second side bet application 117 as well as for a bet indicated in a bet meter 110. The system 100 can determine when a player activates the spin control 112. The application management module 104 can receive game results for the primary wagering game application 103, after the spin control 112 is activated, and then receive account information related to the bet indicated in the bet meter 110. Concurrently, the application management module 104 can receive data from (e.g., query, receive published data from, etc.) the first side-bet application 115 and the second side bet application 117 to determine if the status for the side bets have changed (e.g., if the player account has won or lost any of the side bets). If so, the application management module 104 can communicate winnings, or loss, event data for the side bet with the account server 170, and subsequently update the credit meter 110 to reflect winnings or losses in the side bet.

Figure 6:
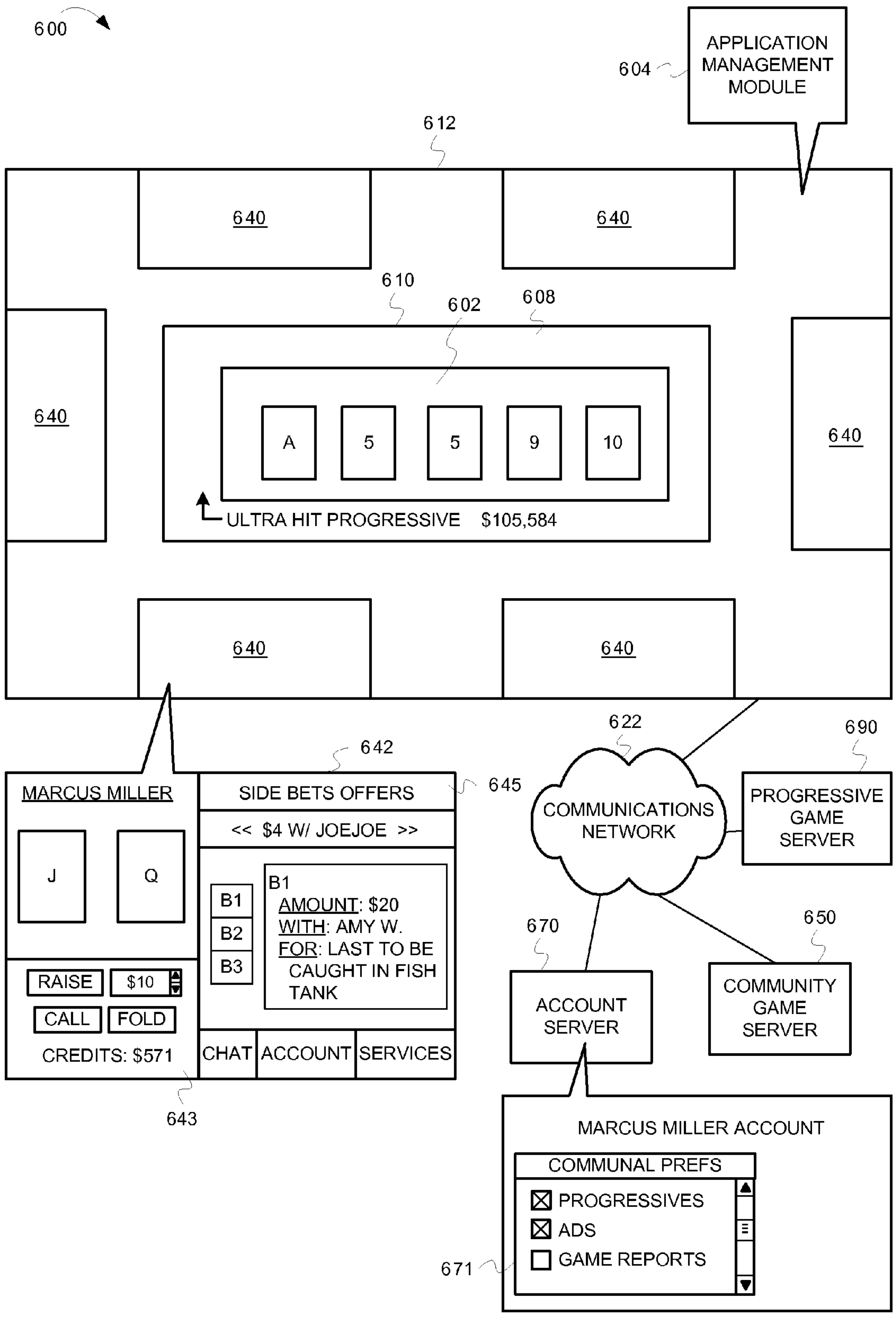
FIG. 6 is an illustration of managing wagering game event data in a community wagering game, according to some embodiments.

Returning to FIG. 3, in another example, the system can determine progressive game participation and present progressive game status information in a common display area. FIG. 6 illustrates an example. In FIG. 6, a wagering game system ("system") 600 can include a community game table ("community table") 612 connected to a community game server 650 via a communications network 622. The community table 612 and the community game server 650 can host a community game (e.g., poker, blackjack, etc.). The community table 612 can have an application management module 604. Multiple players can surround the community table 612 while the community table 612 presents the community game in a central display 610. The central display 610 can include a communal game display 602. The communal game display 602 can display a common aspect of the game, for example, the deck and dealers hand in Texas Hold 'Em. The central display 610 can also include a communal news feeder 608 that can display items, beyond the community game, that are of interest to the entire table such as a casino-wide progressive. Multiple players can have their own player station interfaces ("player stations") 640 in which they can interact with the community game running on the community table 612. Further, each player can make side bets, access their wagering accounts, participate in social messaging with other players, etc. using the player stations 640. The application management module 604 can determine that more than one player at the player stations 640 are participating in betting activity for secondary games that are tied into progressive bonus opportunities. For instance, a player station 640 can present a composite interface 642 that presents a composite of primary gaming activity and secondary gaming activity. A first section 643 of the composite interface 642 can present a player's hand and a player's game control objects for the community wagering game being played at the community table 612. A second section 645 of the composite interface 642 can present secondary applications that run concurrently with the community game. The application management module 604 can coordinate and control presentation of data in the composite interface 642 and on the community table 612. In one embodiment, the communal game display 602 and communal news feeder 608 may need to know when a player pushes a bet button at a player station 640. The communal game display 602 and communal news feeder 608 may have subscribed to the application management module 604 to provide them with event data for the bet button activity. When a player activates the bet button at the player station 640, the application management module 604 lets the communal game display 602 know that the bet button was pressed and, for example, updates a bet total in the communal game display 602. At the same time, the application management module 604 can monitor secondary gaming activity in the second section 645 of the composite interface 642. Side bets and/or other secondary wagering activity in the second section 645 may contribute to a progressive jackpot. A progressive game server 690 can be subscribed to the application management module 604 to receive information about bets for secondary games that contribute a portion to a progressive jackpot. The application management module 604, therefore, can provide betting event data to the progressive game server 690. At the same time, the progressive game server 690 can provide to the application management module 604 updates for progressive jackpot amounts. The application management module 604 can coordinate with the communal news feeder 608 to present progressive jackpot amounts. The application management module 604 can also refer to player account preferences to determine whether player accounts are interested in receiving news feeds in communal gaming areas. For instance, the application management module 604 can refer to an account server 670, which includes a player account that has communal preferences 671. The communal preferences 671 can indicate whether a player wants to receive news events. The application management module 604, therefore, can determine whether a certain number of players desire to see certain information and, if so, the application management module 604 can present the desired information in the communal news feeder 608. In some embodiments, primary gaming applications in the composite interface 642 and secondary gaming applications in the central display 610 may produce event data in different data formats. The application management module 604 can facilitate communication between the primary and secondary applications in the composite interface 642 and the central display 610, by converting data formats as needed. In some embodiments, the system 600 can have multiple application management modules (e.g., one for the communal game display 602, one for the communal news feeder 608, individual ones for each of the player stations 640, etc.). The multiple application management modules can function in a hierarchy in the system 600. For example, one or more upper level application management modules can coordinate with, and control, overall activity for lower level application management modules, or sub-application management modules, at the community table 612. The sub-application management modules can be configured to work with specific application types, account types, hardware types, functionality types, etc. under the upper level application management module(s).

Figure 7:
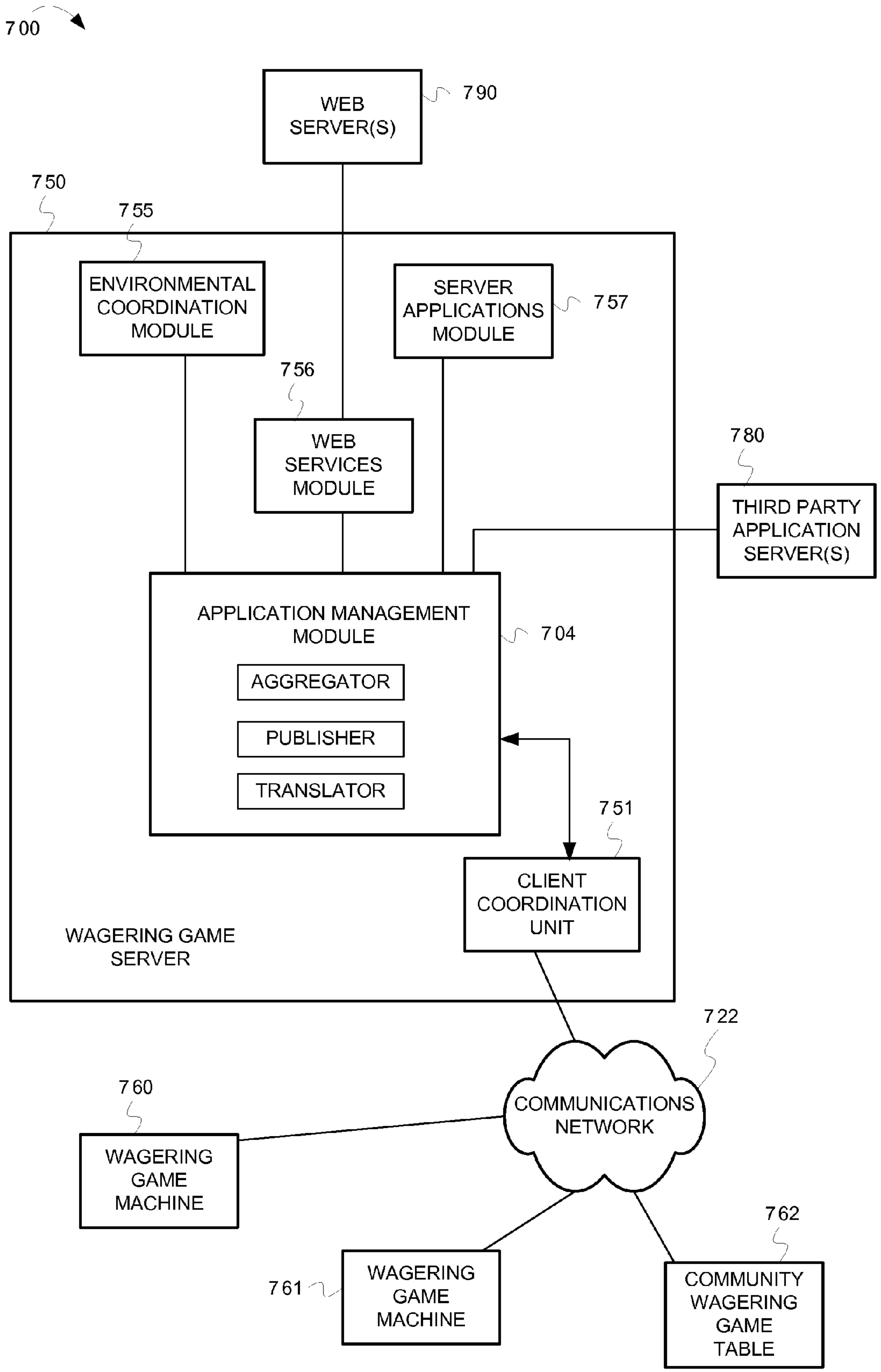
FIG. 7 is an illustration of managing wagering game event data on a server, according to some embodiments.

Returning to FIG. 3, some embodiments have described an application management module on a wagering game client device. However, in other embodiments, the system may include an application management module on a server. In some embodiments, an application management module on a server can serve server applications and other applications external to a server (e.g., third party application servers) that may subscribe to the application management module on the server in addition to, or instead of, to an application management module on a wagering game machine. In some embodiments, subscribed servers may prefer to subscribe directly to the server instead subscribing directly to the client(s). FIG. 7 illustrates an example of a wagering game system ("system") 700 that includes a wagering game server 750 with an application management module 704. The application management module 704 can include aggregator, publisher, and conversion modules, similar to other application management module embodiments described above. In some embodiments, any component on the wagering game server 750 (e.g., an environmental coordination module 755, a server applications module 757, and a web services module 756) or any external data source (e.g., a web server 790 and third party application server(s) 780) can request event data for any wagering game client device (e.g., the wagering game machines 760, 761 and/or the community wagering game table 762) via a communications network 722. The application management module 704 can communicate with a client coordination unit 751. The client coordination unit 751 communicates with the various wagering game client devices to obtain event data. The application management module 704 can receive event data from the coordination unit 751, aggregate the event data, and route the event data to the requesting components of the wagering game server 750 and to requesting external data sources or application used for gaming purposes or related to gaming and casino services. In some embodiments, the wagering game client devices (e.g., the wagering game machines 760, 761 and/or the community wagering game table 762) can include individual application management modules that work in conjunction with the application management module 704 on the wagering game server 750. The individual application management modules can persist event data, including critical events, on the wagering game client devices. However, in some embodiments, there may be critical data that a base game on the wagering game client devices may not need or require to be stored on the wagering game client devices. As a result, the wagering game client devices can send the critical event data that it does not require to the wagering game server 750. The application management module 704 can store the critical data on the wagering game server 750, or in some other location accessible to the wagering game server 750, and provide critical data to requesting data sources (e.g., to a regulation server, an auditing server, a backup server, or other sources interested in the critical data). The wagering game client devices can also send to the wagering game server 750 player preference events, secondary wagering events, or other event data that is more appropriate to store off of the wagering game client devices. In addition to aggregating and publishing event data, the application management module 704 can also perform translation, or conversion, operations for converting and communicating different data formats. For example, event data can come from the wagering game client devices in a first data format. The application management module 704 can convert, or reformat the first format to other formats that are understood by other server components and/or other external devices. The application management module 704 can also receive event data from server components and/or external devices, convert the data to the first format, and provide the converted event data to the wagering game client devices.

In some embodiments, an application management module on a wagering game client device can interact with a server component (e.g., the application management module 704 on the server 750). In some embodiments, the application management module on a wagering game client device can communication with the server 750 to get a list of applications that can be run on the wagering game client device. The application management module on the client device can then control the list of applications on the wagering game client device (e.g., initialize applications, control the applications during a gaming session, unload application, etc.). The server 750 can also provide commands to dynamically load and unload applications. For example, an operator can configure the server 750 with current applications, and retire old applications. The server 750, however, can retire an application and send commands to the client's application management module. The client's application management module can unload the retired application dynamically, without having to restart.

Additional Example Operating Environments

This section describes example operating environments, systems and networks, and presents structural aspects of some embodiments.

Wagering Game Machine Architecture

Figure 8:
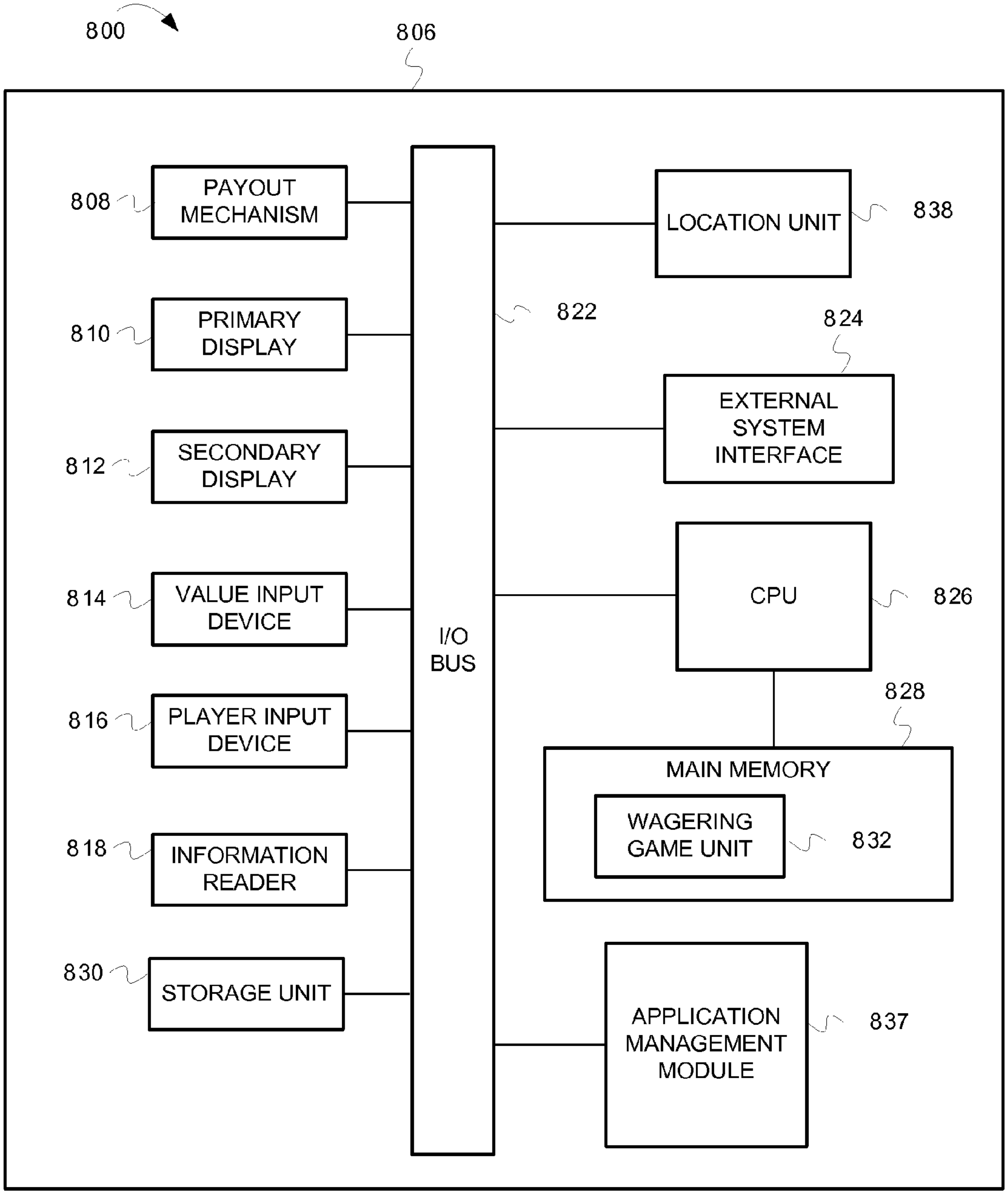
FIG. 8 is an illustration of a wagering game machine architecture 800, according to some embodiments.

FIG. 8 is a conceptual diagram that illustrates an example of a wagering game machine architecture 800, according to some embodiments. In FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In some embodiments, the wagering game unit 832 can present wagering games, such as video poker, video black jack, video slots, video lottery, reel slots, etc., in whole or part.

The CPU 826 is also connected to an input/output ("I/O") bus 822, which can include any suitable bus technologies, such as an AGTL+frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems (e.g., wagering game networks). The external system interface 824 can include logic for exchanging information over wired and wireless networks (e.g., 802.11g transceiver, Bluetooth transceiver, Ethernet transceiver, etc.)

The I/O bus 822 is also connected to a location unit 838. The location unit 838 can create player information that indicates the wagering game machine's location/movements in a casino. In some embodiments, the location unit 838 includes a global positioning system (GPS) receiver that can determine the wagering game machine's location using GPS satellites. In other embodiments, the location unit 838 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 8, in some embodiments, the location unit 838 is not connected to the I/O bus 822.

In some embodiments, the wagering game machine 806 can include additional peripheral devices and/or more than one of each component shown in FIG. 8. For example, in some embodiments, the wagering game machine 806 can include multiple external system interfaces 824 and/or multiple CPUs 826. In some embodiments, any of the components can be integrated or subdivided.

In some embodiments, the wagering game machine 806 includes an application management module 837. The application management module 837 can process communications, commands, or other information, where the processing can manage wagering game applications and application events.

Furthermore, any component of the wagering game machine 806 can include hardware, firmware, and/or machine-readable storage media including instructions for performing the operations described herein.

Wagering Game Machine

Figure 9:
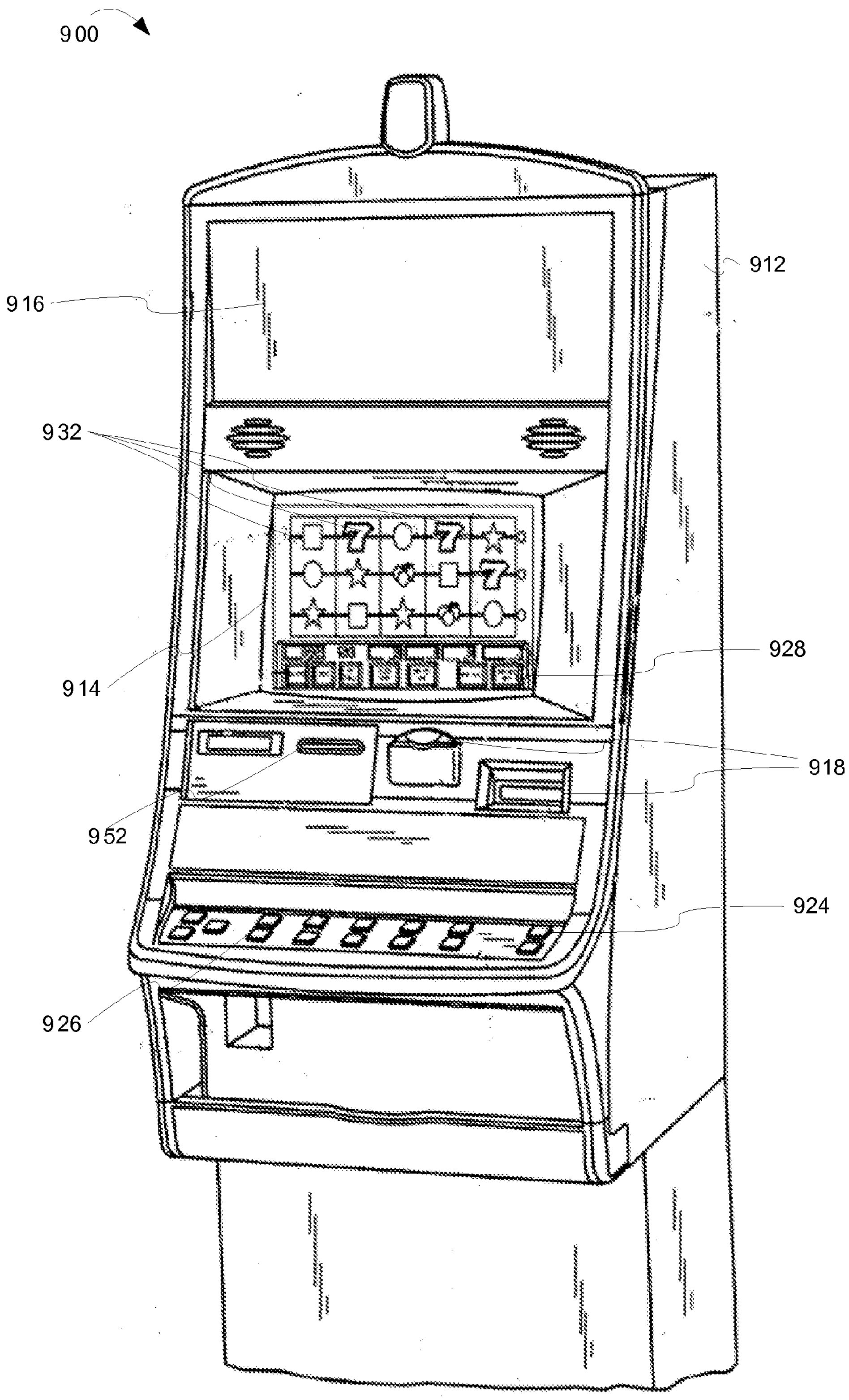
FIG. 9 is an illustration of a wagering game machine 900, according to some embodiments.

FIG. 9 is a conceptual diagram that illustrates an example of a wagering game machine 900, according to some embodiments. Referring to FIG. 9, the wagering game machine 900 can be used in gaming establishments, such as casinos. According to some embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a free standing model, bar top model, mobile handheld model, or workstation console model.

A player begins playing a basic wagering game by making a wager via the value input device 918. The player can initiate play by using the player input device's buttons or touch screen 928. The basic game can include arranging a plurality of symbols along a pay line 932, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

The described embodiments may be provided as a computer program product, or software, that may include a machine-readable storage medium having stored thereon instructions, which may be used to program a computer system (or other electronic device(s)) to perform a process according to embodiments(s), whether presently described or not, because every conceivable variation is not enumerated herein. A machine-readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, some embodiments may include machine-readable signal media, which includes an electrical, optical, acoustical or other form of propagated signal (e.g., carrier waves, infrared signals, digital signals, etc.).

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:

receiving first wager data from a first wagering game application running on a wagering game client device, wherein the first wager data is in a first data format that is natively understood by the first wagering game application and not natively understood by a second wagering game application running on the wagering game client device;

receiving second wager data from the second wagering game application, wherein the second wager data is in a second data format different from the first data format, and wherein the second data format is natively understood by the second wagering game application and not natively understood by the first wagering game application;

aggregating the first wager data and the second wager data into an event repository;

opening a communication channel to a third application after the aggregating of the first wager data and the second wager data, wherein the first data format and the second data format are not natively understood by the third application;

converting, via one or more processors, the first wager data and the second wager data into a third data format natively understood by the third application; and via at least one of the one or more processors, communicating to the third application, via the communication channel, the first wager data and the second wager data for use by the third application to transact the first wager and the second wager, wherein the communicating the first wager data and the second wager data to the third application is after the converting.

2. The computer-implemented method of claim 1 further comprising:

determining that the third application requests information of a type related to wagers, determining that the first wager data and the second wager data stored in the event repository are of the type related to wagers; and opening the communication channel to the third application in response to determining that the first wager data and the second wager data are of the type related to wagers.

3. The computer-implemented method of claim 1 further comprising:

receiving response data from the third application after the third application transacts the first wager and second wager from a player account;

converting the response data to the first data format and the second data format; and providing the response data to the first wagering game application and the second wagering game application for presentation via a display device associated with the wagering game client device.

4. The computer-implemented method of claim 3, wherein providing the response data comprises providing the response data for presentation in a common area of the display device, wherein the common area includes information related to events for the multiple instances of the wagering game applications.

5. The computer-implemented method of claim 3, wherein the response data includes one or more of a player account balance, a wagering game result, a progressive jackpot status, and a community news feed.

6. The computer-implemented method of claim 3 wherein a first portion of the response data includes a first credit balance for the first wagering game application, wherein the first credit balance is based on an outcome related to the first wager data, and wherein a second portion of the response data includes a second credit balance for the second wagering game application, wherein the second credit balance is based on an outcome related to the second wager data.

7. The computer-implemented method of claim 6, wherein the converting the response data to the first data format and the second data format comprises:

converting the first portion of the response data to the first data format; and converting the second portion of the response data to the second data format.

8. The computer-implemented method of claim 7, wherein the providing the response data for presentation via the display device comprises:

after converting the first portion of the response data to the first data format, providing the first portion of the response data to the first wagering game application for presentation of the first credit balance via the first wagering game application; and after converting the second portion of the response data to the second data format, providing the second portion of the response data to the second wagering game application for presentation of the second credit balance via the second wagering game application.

9. One or more non-transitory, machine-readable storage media having instructions stored thereon, which when executed by a set of one or more processors causes the set of one or more processors to perform operations comprising:

receiving first wager data from a first wagering game application running on a wagering game client device, wherein the first wager data is in a first data format that is natively understood by the first wagering game application and not natively understood by a second wagering game application running on the wagering game client device;

receiving second wager data from the second wagering game application, wherein the second wager data is in a second data format different from the first data format, and wherein the second data format is natively understood by the second wagering game application and not natively understood by the first wagering game application;

aggregating the first wager data and the second wager data into an event repository;

opening a communication channel to a third application after the aggregating of the first wager data and the second wager data, wherein the first data format and the second data format are not natively understood by the third application;

converting the first wager data and the second wager data into a third data format natively understood by the third application; and communicating to the third application, via the communication channel, the first wager data and the second wager data for use by the third application to transact the first wager and the second wager, wherein the communicating the first wager data and the second wager data to the third application is after the converting.

10. The one or more non-transitory, machine-readable storage media of claim 9, said operations further comprising:

determining that the third application requests information of a type related to wagers;

determining that the first wager data and the second wager data stored in the event repository are of the type related to wagers; and opening the communication channel to the third application in response to determining that the first wager data and the second wager data are of the type related to wagers.

11. The one or more non-transitory, machine-readable storage media of claim 9, said operations further comprising:

receiving response data from the third application after the third application transacts the first wager and second wager from a player account;

converting the response data to the first data format and the second data format; and providing the response data to the first wagering game application and the second wagering game application for presentation via a display device associated with the wagering game client device.

12. The one or more non-transitory, machine-readable storage media of claim 11, wherein a first portion of the response data includes a first credit balance for the first wagering game application, wherein the first credit balance is based on an outcome related to the first wager data, and wherein a second portion of the response data includes a second credit balance for the second wagering game application, wherein the second credit balance is based on an outcome related to the second wager data.

13. The one or more non-transitory, machine-readable storage media of claim 12, wherein the operation for the converting the response data to the first data format and the second data format, includes operations further comprising:

converting the first portion of the response data to the first data format; and converting the second portion of the response data to the second data format.

14. The one or more non-transitory, machine-readable storage media of claim 13, wherein the operation for providing the response data for presentation via the display device includes operations further comprising:

after converting the first portion of the response data to the first data format, providing the first portion of the response data to the first wagering game application for presentation of the first credit balance via the first wagering game application; and after converting the second portion of the response data to the second data format, providing the second portion of the response data to the second wagering game application for presentation of the second credit balance via the second wagering game application.

15. A system comprising:

one or more processors; and one or more memory units configured to store instructions which, when executed by at least one of the one or more processors, cause the system to receive first wager data from a first wagering game application running on a wagering game client device, wherein the first wager data is in a first data format that is natively understood by the first wagering game application and not natively understood by a second wagering game application running on the wagering game client device, receive second wager data from the second wagering game application, wherein the second wager data is in a second data format different from the first data format, and wherein the second data format is natively understood by the second wagering game application and not natively understood by the first wagering game application, aggregate the first wager data and the second wager data into an event repository, open a communication channel to a third application after aggregation of the first wager data and the second wager data into the event repository, wherein the first data format and the second data format are not natively understood by the third application, convert the first wager data and the second wager data into a third data format natively understood by the third application, and after conversion of the first wager data and the second wager data into the third data format, publish to the third application, via the communication channel, the first wager data and the second wager data for use by the third application to transact the first wager and the second wager.

16. The system of claim 15, wherein the one or more memory units are configured to store instructions which, when executed by at least one of the one or more processors, further cause the system to determine that the third application uses information of a type related to wagers, determine that the first wager data and the second wager data stored in the event repository are of the type related to wagers, and open the communication channel to the third application in response to determining that the first wager data and the second wager data are of the type related to wagers.

17. The system of claim 15, wherein the one or more memory units are configured to store instructions which, when executed by at least one of the one or more processors, further cause the system to receive response data from the third application after the third application transacts the first wager and second wager from a player account, convert the response data to the first data format and the second data format, and provide the response data to the first wagering game application and the second wagering game application for presentation via a display device associated with the wagering game client device.

18. The system of claim 17, wherein a first portion of the response data includes a first credit balance for the first wagering game application, wherein the first credit balance is based on an outcome related to the first wager data, and wherein a second portion of the response data includes a second credit balance for the second wagering game application, wherein the second credit balance is based on an outcome related to the second wager data.

19. The system of claim 18, wherein the one or more memory units are configured to store instructions which, when executed by at least one of the one or more processors, further cause the system to, convert the first portion of the response data to the first data format, and convert the second portion of the response data to the second data format.

20. The system of claim 19, wherein the one or more memory units are configured to store instructions which, when executed by at least one of the one or more processors, further cause the system to, after conversion of the first portion of the response data to the first data format, provide the first portion of the response data to the first wagering game application for presentation of the first credit balance via the first wagering game application; and after conversion of the second portion of the response data to the second data format, provide the second portion of the response data to the second wagering game application for presentation of the second credit balance via the second wagering game application.

21. An apparatus comprising:

means for receiving first wager data from a first wagering game application running on a wagering game client device, wherein the first wager data is in a first data format that is natively understood by the first wagering game application and not natively understood by a second wagering game application running on the wagering game client device;

means for receiving second wager data from the second wagering game application, wherein the second wager data is in a second data format different from the first data format, and wherein the second data format is natively understood by the second wagering game application and not natively understood by the first wagering game application;

means for aggregating the first wager data and the second wager data into an event repository;

means for opening a communication channel to a third application after the aggregating of the first wager data and the second wager data, wherein the first data format and the second data format are not natively understood by the third application;

means for converting the first wager data and the second wager data into a third data format natively understood by the requesting application; and means for publishing the first wager data and the second wager data, after conversion of the first wager data and the second wager data, for use by the third application to transact the first wager and the second wager.

22. The apparatus of claim 21 further comprising:

means for determining that the third application uses information of a type related to wagers, means for determining that the first wager data and the second wager data stored in the event repository are of the type related to wagers, and means for opening the communication channel to the third application in response to determining that the first wager data and the second wager data are of the type related to wagers.

23. The apparatus of claim 21 further comprising:

means for receiving response data from the third application after the third application transacts the first wager and second wager from a player account;

means for converting the response data to the first data format and the second data format; and means for providing the response data to the first wagering game application and the second wagering game application for presentation via a display device associated with the wagering game client device.

24. The apparatus of claim 23, wherein a first portion of the response data includes a first credit balance for the first wagering game application, wherein the first credit balance is based on an outcome related to the first wager data, wherein a second portion of the response data includes a second credit balance for the second wagering game application, and wherein the second credit balance is based on an outcome related to the second wager data.

25. The apparatus of claim 24, wherein the means for converting the response data to the first data format and the second data format comprises:

means for converting the first portion of the response data to the first data format;

means for converting the second portion of the response data to the second data format;

after converting the first portion of the response data to the first data format, means for providing the first portion of the response data to the first wagering game application for presentation of the first credit balance via the first wagering game application; and after converting the second portion of the response data to the second data format, means for providing the second portion of the response data to the second wagering game application for presentation of the second credit balance via the second wagering game application.

* * * * *